US010281728B2

(12) United States Patent
Miller et al.

(10) Patent No.: US 10,281,728 B2
(45) Date of Patent: May 7, 2019

(54) CONSTANT-FORCE HEAD MOUNTED DISPLAY RESTRAINT SYSTEM

(71) Applicant: FACEBOOK TECHNOLOGIES, LLC, Menlo Park, CA (US)

(72) Inventors: Robin Michael Miller, Redmond, WA (US); Peter Wesley Bristol, Seattle, WA (US); Joseph Patrick Sullivan, Issaquah, WA (US); Jared I. Drinkwater, Auburn, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 15/244,462

(22) Filed: Aug. 23, 2016

(65) Prior Publication Data

US 2018/0055202 A1    Mar. 1, 2018

(51) Int. Cl.
*G06F 3/041* (2006.01)
*G09G 5/00* (2006.01)
*G02B 27/01* (2006.01)

(52) U.S. Cl.
CPC .. *G02B 27/0176* (2013.01); *G02B 2027/0152* (2013.01)

(58) Field of Classification Search
CPC ......... G06F 1/163; G06F 3/011; F16M 13/04; G02B 2027/0136; G02B 2027/0156; G02B 27/0176; H05K 5/0004; H05K 5/0017; H05K 5/0086; H05K 5/0204; A45F 5/00

USPC ............................................................ 345/8
See application file for complete search history.

(56) References Cited

U.S. PATENT DOCUMENTS

| | | | | |
|---|---|---|---|---|
| 2002/0118506 A1* | 8/2002 | Saito | ....................... | G06F 1/163 361/679.03 |
| 2007/0212931 A1* | 9/2007 | Livingston | ................ | A45F 5/00 439/501 |
| 2009/0230229 A1* | 9/2009 | Yasuda | ..................... | A43B 5/04 242/395 |
| 2014/0375947 A1* | 12/2014 | Park | ........................ | G02C 5/16 351/113 |
| 2016/0062125 A1* | 3/2016 | Baek | .................. | G02B 27/0176 361/679.01 |

* cited by examiner

*Primary Examiner* — Insa Sadio
(74) *Attorney, Agent, or Firm* — FisherBroyles, LLP

(57) ABSTRACT

Technology is provided for restraint systems for use with head mounted displays and head mounted displays incorporating the same. The head mounted display includes a display unit including a display housing and one or more display devices. A retention assembly attaches to the display unit to support the unit on a user's head. The retention assembly includes at least one tensioner mechanism including a housing having an anchor portion coupled to the display housing and a slider positioned in the housing. A strap is coupled to the slider and configured to support the head mounted display on the user's head. A tension element having a first end portion coupled to the housing and a second end portion coupled to the slider provides a constant force on the strap to comfortably pull the strap against the user's head in order to retain the head mounted display on the user's head.

18 Claims, 4 Drawing Sheets

CONSTANT-FORCE HEAD MOUNTED DISPLAY RESTRAINT SYSTEM

TECHNICAL FIELD

This patent application is directed to head mounted displays and, more specifically, to the restraint system of a head mounted display.

BACKGROUND

Traditional head mounted displays include a display unit having a video display and a pair of lenses positioned next to the video display. When a user positions the display unit against their face, a strap assembly retains the display unit in position. Conventional strap assemblies require the user to adjust the straps manually each time the display unit is put on. Accordingly there is a need for improved restraint systems to provide comfortable and convenient retention of a head mounted display.

BRIEF DESCRIPTION OF THE DRAWINGS

Embodiments of the constant-force head mounted display restraint systems introduced herein may be better understood by referring to the following Detailed Description in conjunction with the accompanying drawings, in which like reference numerals indicate identical or functionally similar elements.

Figure 1:
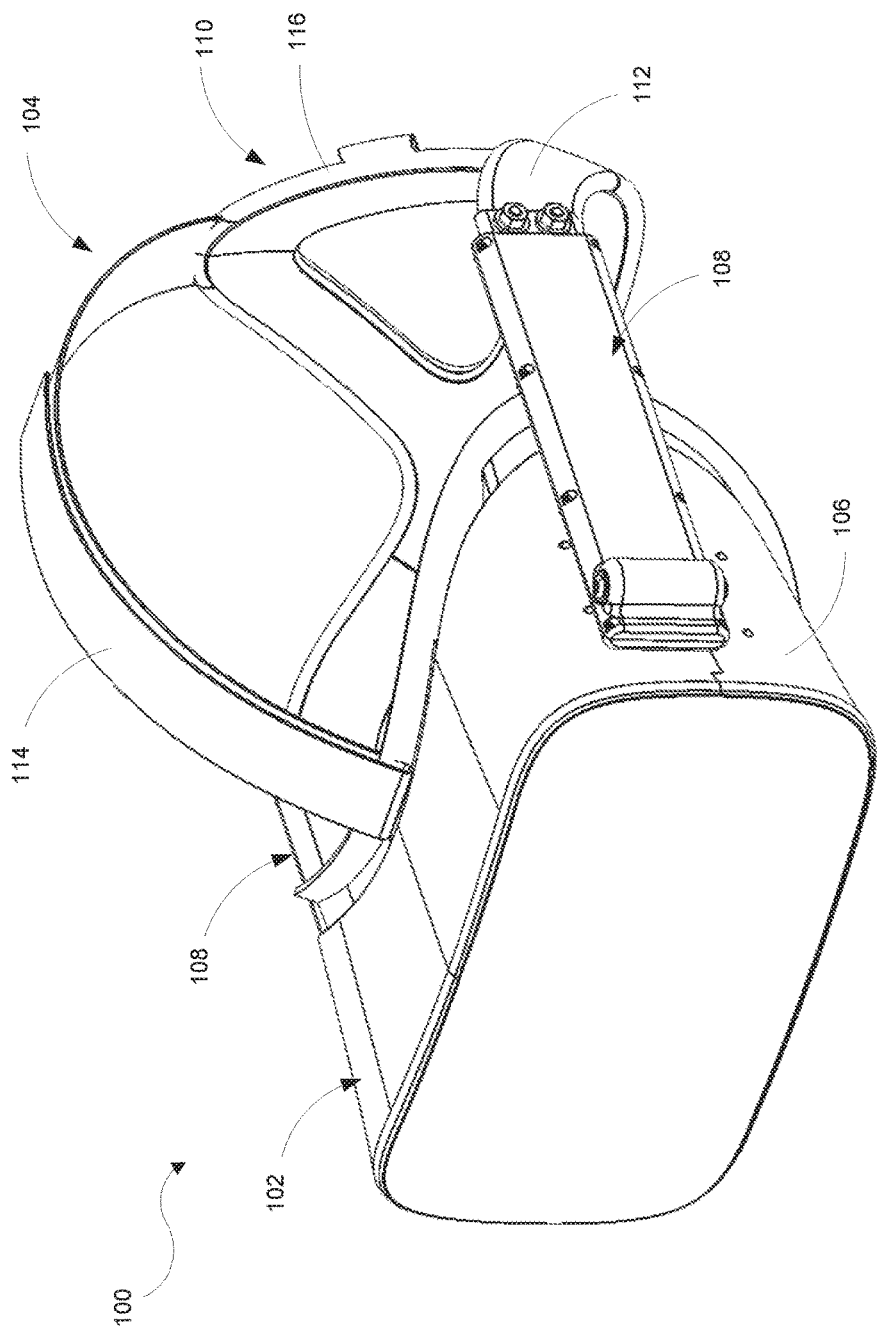
FIG. 1 is an isometric view of a head mounted display according to a representative embodiment.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to limit the embodiments described. On the contrary, the embodiments are intended to cover all modifications, equivalents, and alternatives falling within the scope of the embodiments as defined by the appended claims.

DETAILED DESCRIPTION

Overview

Restraint systems for use with head mounted displays or other head mounted articles are disclosed. In an embodiment, a head mounted display includes a display unit including a display housing and one or more display devices. A retention assembly attaches to the display unit to support the unit on a user's head. The retention assembly includes at least one tensioner mechanism including a housing having an anchor portion coupled to the display housing and a slider positioned in the housing. A strap is coupled to the slider and configured to support the head mounted display on the user's head. A tension element having a first end portion coupled to the housing and a second end portion coupled to the slider provides a constant force on the strap to comfortably pull the strap against the user's head in order to retain the head mounted display on the user's head.

General Description

Various examples of the devices introduced above will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

FIG. 1 illustrates a head mounted display 100 according to a representative embodiment. The head mounted display 100 includes a display unit 102 and a retention assembly 104 configured to support the head mounted display 100 on a user's head. The display unit 102 includes a housing 106 with one or more display devices (not shown) positioned within the housing 106.

The retention assembly 104 includes at least one tensioner mechanism 108 coupled to the housing 106. In some embodiments, the retention assembly 104 includes a pair of tensioner mechanisms 108 coupled to opposite sides of the housing 106. A strap assembly 110 is coupled to the tensioner mechanisms 108 and is configured to support the display unit 102 on the user's head. The strap assembly 110 includes a pair of lateral strap portions 112, an occipital lobe cradle 116 interconnecting the pair of lateral strap portions 112, and a top strap 114 extending between the display unit 102 and the occipital lobe cradle 116. In some embodiments, the tensioner mechanism 108 provides a substantially constant force on the strap 110 to comfortably pull the strap 110 against the user's head in order to retain the display unit 102 on the user's head.

Figure 2:
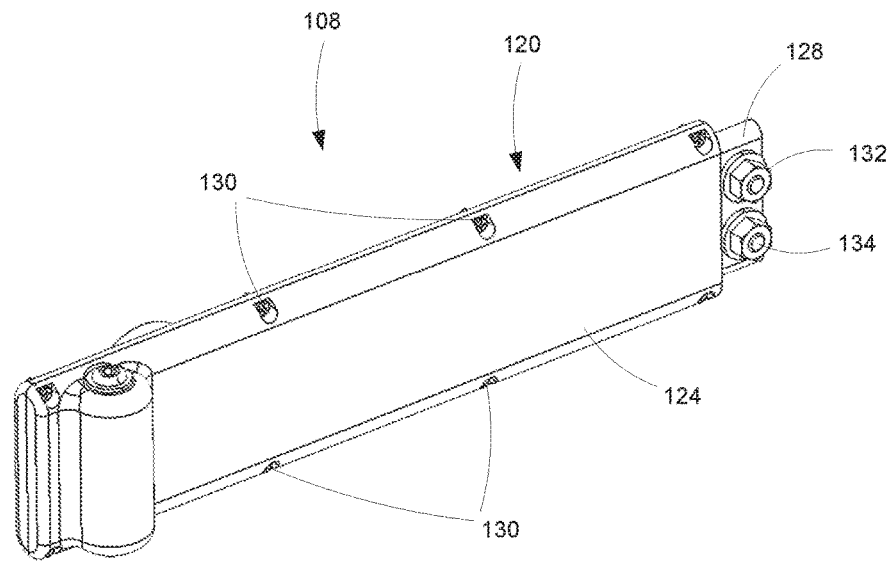
FIG. 2 is an isometric view of a tensioner mechanism according to a representative embodiment.
Figure 3:
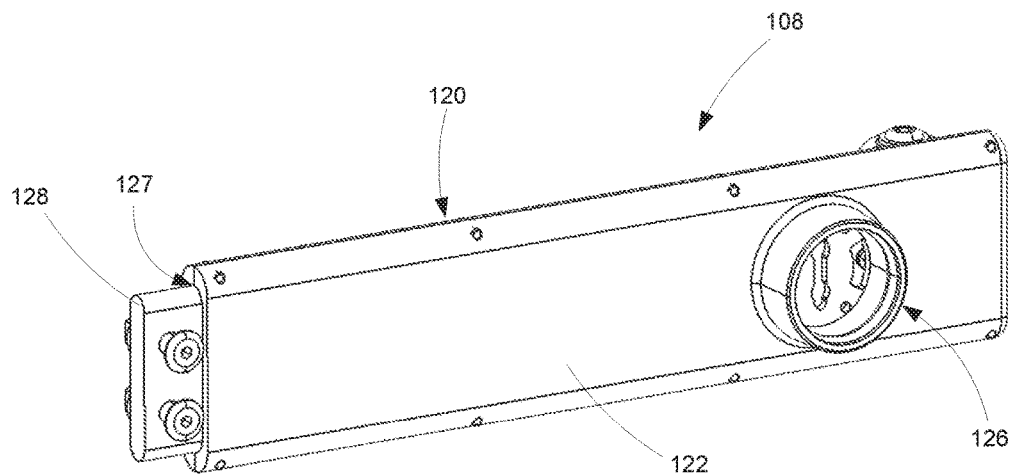
FIG. 3 is an isometric view of the tensioner mechanism shown in FIG. 2 as viewed from the opposite side.

As shown in FIGS. 2 and 3, the tension mechanism 108 includes a housing 120 including a first panel 122 and a second panel 124 joined together by a plurality of suitable fasteners, such as screws 130. The first panel 122 includes an anchor portion 126 coupled to the display housing 106 (FIG. 1). In some embodiments, the anchor portion 126 snaps into the display housing 106 and is rotatable with respect to the display housing 106. The first panel 122 and the second panel 124 form an interior slideway 127. Slider 128 is positioned in the slideway 127 for reciprocating axial movement therein. In some embodiments, the slider 128 is coupled to the lateral strap portions 112 with suitable fasteners, such as bolts 134 and nuts 132.

Figure 4A:
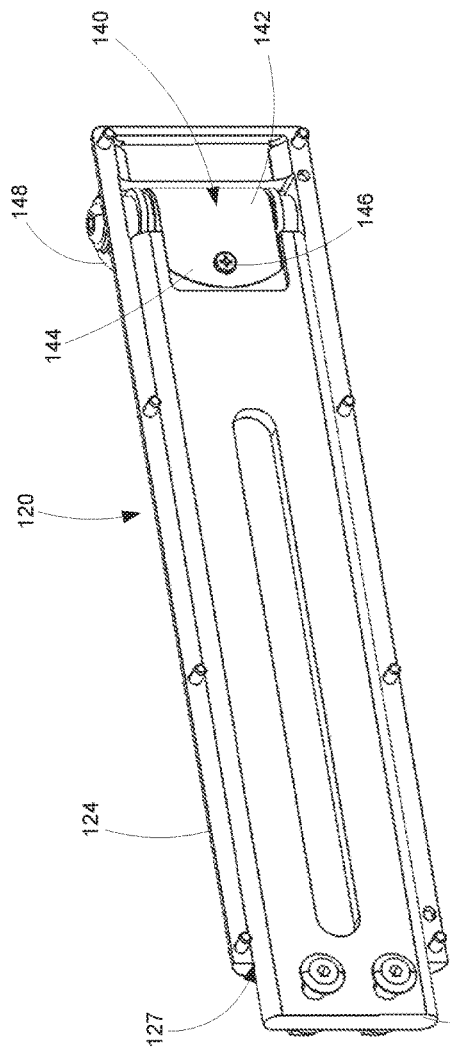
FIG. 4A is an isometric view of the tensioner mechanism shown in FIGS. 2 and 3 with the side panel removed to illustrate the internal components of the mechanism.
Figure 4B:
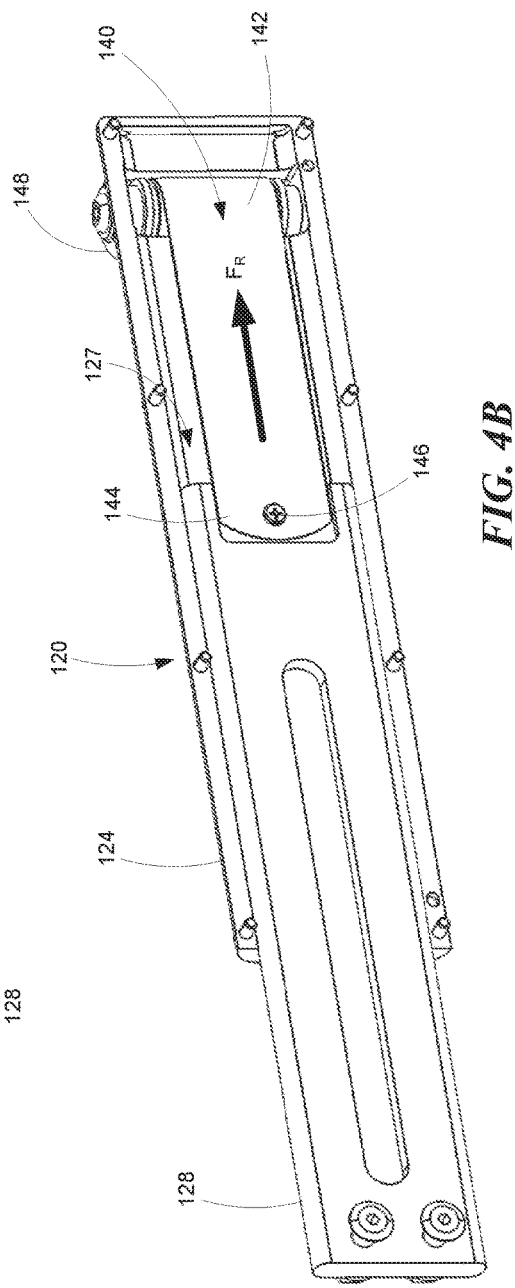
FIG. 4B is an isometric view similar to FIG. 4A with the tensioner in an extended configuration.

With reference to FIGS. 4A and 4B, the slider 128 can be moved axially back and forth in slideway 127 against the force of a tension element 140. The tension element 140 has a first end portion 142 coupled to the housing 120 and a second end portion 144 coupled to the slider 128. The first end portion 142 is contained in a spring cavity 148 of the second panel 124. The second end portion 144 is coupled to the slider with a screw 146 or other connection element. In the illustrated embodiment, the tension element 140 is a constant-force spring constructed as a rolled ribbon of spring steel or other metal, such that the spring is in a retracted position when it is substantially fully rolled up, as shown in FIG. 4A. As it is unrolled away from the retracted position, the restoring force $F_R$ is generated primarily from the curved portion of the ribbon near the roll. Because the geometry of that region remains nearly constant as the spring unrolls, the resulting force is substantially constant. Thus, the restoring force when the ribbon is rolled up and the slider 128 is in the retracted position (FIG. 4A) and the restoring force when the ribbon is unrolled and the slider 128 is in the extended position (FIG. 4B) are substantially the same.

The restoring force $F_R$ constantly pulls axially on the slider 128 toward the retracted position, thereby urging the strap 110 and/or the display housing 106 (FIG. 1) against the user's head and automatically adjusting the straps to fit the user's head without manual adjustment. In addition, the constant force provided by the tension element 140 provides a constant comfortable fit no matter how big the user's head or how far the strap is pulled toward the extended position.

Figure 5:
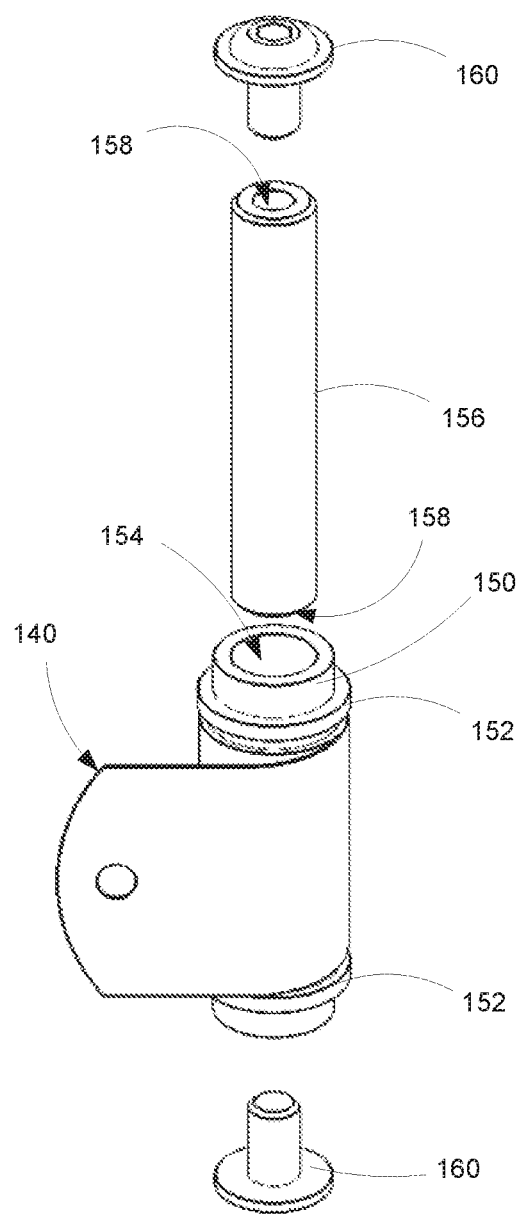
FIG. 5 is an exploded isometric view of the tension element shown in FIGS. 4A and 4B.

As shown in FIG. 5, the tension element 140 is rolled or wound around a spool 150. The spool 150 includes spaced apart flanges 152 adapted to position the tension element 140 on the spool. The spool is positioned on an axle 156 that is secured in the spring cavity 148 (FIG. 4B). The axle 156 extends through a spool bore 154 formed through the spool 150. Accordingly, the spool 150 can rotate about the axle 156. The axle 156 is secured in the spring cavity 148 with screws 160 that thread into threaded bores 158.

Although the embodiments described herein are directed to tension elements in the form of a rolled ribbon of spring steel, other substantially constant force tension elements may be used. For example and without limitation, in various embodiments, the tension element can comprise a clock-type spring, an elastic element, and/or a coil extension spring. The disclosed restraint systems for use with head mounted displays can also be used on other head mounted articles, such as for example and without limitation, welding masks, scuba masks, head lamps, helmets, and face shields.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A restraint system for use with a head mounted article, the system comprising:
   at least one tensioner mechanism, including:
      a housing having an anchor portion connectable to a head mounted article;
      a slider positioned in the housing for axial movement between a retracted position and an extended position; and
      a tension element comprising a ribbon of spring metal having:
         a first end portion rolled around a rotatable spool that is coupled to the housing such that the rotatable spool is circumferentially surrounded by the ribbon of spring metal when the slider is in the retracted position; and
         a second end portion that is unrolled and coupled to the slider, wherein the ribbon of spring metal applies a substantially constant urging force toward the retracted position throughout the axial movement between the retracted position and the extended position; and
   a strap coupled to the slider and configured to support the head mounted article on a user's head.

2. The restraint system of claim 1, wherein the spool includes spaced apart flanges adapted to position the first end portion of the ribbon of spring metal on the spool.

3. The restraint system of claim 1, wherein the housing includes a first panel including the anchor portion and a second panel attached to the first panel and having a spring cavity adapted to contain the first end portion of the ribbon of spring metal.

4. The restraint system of claim 3, wherein the spool is positioned on an axle secured within the spring cavity such that the spool is rotatable about the axle.

5. The restraint system of claim 1, wherein the first end portion of the ribbon of spring metal is unrolled from the spool during axial movement of the slider from the retracted position to the extended position.

6. The restraint system of claim 1, wherein a curved region of the ribbon of spring metal between a rolled portion of the ribbon of spring metal and an unrolled portion of the ribbon of spring metal primarily applies the substantially constant urging force toward the retracted position.

7. The restraint system of claim 6, wherein a portion of the ribbon of spring metal that includes the curved region changes as the slider moves from the retracted position to the extended position.

8. A head mounted display, comprising:
a display unit including a display housing and one or more display devices; and
a retention assembly, including:
at least one tensioner mechanism, including:
a housing having an anchor portion coupled to the display housing;
a slider positioned in the housing; and
a tension element comprising a ribbon of spring metal having:
a first end portion rolled around a rotatable spool that is coupled to the housing such that the rotatable spool is circumferentially surrounded by the ribbon of spring metal when the slider is in the retracted position; and
a second end portion that is unrolled and coupled to the slider; and
a strap coupled to the slider and configured to support the head mounted display on a user's head.

9. The head mounted display of claim 8, further comprising an occipital lobe cradle coupled to the strap.

10. The head mounted display of claim 9, further comprising a top strap extending between the display unit and the occipital lobe cradle.

11. The head mounted display of claim 8, wherein the at least one tensioner mechanism comprises a pair of tensioner mechanisms coupled to the display unit, wherein the strap extends between the pair of tensioner mechanisms.

12. The head mounted display of claim 8, wherein the housing includes a first panel including the anchor portion and a second panel attached to the first panel and having a spring cavity adapted to contain the first end portion of the ribbon of spring metal.

13. A head mounted display, comprising:
a display unit including a display housing and one or more display devices; and
a retention assembly, including:
a pair of tensioner mechanisms, each including:
a housing including a first panel having an anchor portion coupled to the display housing and a second panel attached to the first panel;
a slider positioned in the housing for movement between a retracted position and an extended position; and
a tension element comprising a ribbon of spring metal having:
a first end portion rolled around a rotatable spool that is coupled to the housing such that the rotatable spool is circumferentially surrounded by the ribbon of spring metal when the slider is in the retracted position; and
a second end portion that is unrolled and coupled to the slider; and
a strap assembly configured to support the head mounted display on a user's head, the strap assembly including:
a strap coupled to the slider of each of the pair of tensioner mechanisms; and
a top strap extending between the display unit and the strap.

14. The head mounted display of claim 13, wherein the ribbons of spring metal act as substantially constant force springs.

15. The head mounted display of claim 13, wherein the ribbons of spring metal each comprise a ribbon of spring steel.

16. The head mounted display of claim 13, wherein each second panel includes a spring cavity adapted to contain the first end portion of the corresponding ribbon of spring metal.

17. The head mounted display of claim 16, wherein the spools are each positioned on an associated axle secured within a corresponding spring cavity.

18. The head mounted display of claim 17, wherein the spools each include spaced apart flanges adapted to position the first end portion of the corresponding ribbon of spring metal on the spool.

* * * * *